(12) United States Patent
Takeo

(10) Patent No.: US 6,606,400 B1
(45) Date of Patent: Aug. 12, 2003

(54) ABNORMAL PATTERN DETECTION PROCESSING METHOD AND SYSTEM

(75) Inventor: Hideya Takeo, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/377,504

(22) Filed: Aug. 20, 1999

(30) Foreign Application Priority Data

Aug. 20, 1998 (JP) .......................................... 10-233815
Jun. 11, 1999 (JP) .......................................... 11-165313

(51) Int. Cl.⁷ ................................................ G06K 9/00
(52) U.S. Cl. ........................ 382/128; 128/922; 600/407
(58) Field of Search ................................ 382/128, 129, 382/130, 131, 132, 133, 226, 257, 260, 308, 311, 156; 250/584, 587; 378/37, 54, 61, 62; 356/237, 394, 446; 600/407

(56) References Cited

U.S. PATENT DOCUMENTS 5,557,687 A * 9/1996 Hara ........................... 382/132
5,583,346 A * 12/1996 Nakajima .................... 250/587
5,761,334 A * 6/1998 Nakajima et al. ............ 382/132
6,272,233 B1 * 8/2001 Takeo ........................... 382/128

* cited by examiner

Primary Examiner—Jayanti K. Patel
Assistant Examiner—Abolfazl Tabatabai
(74) Attorney, Agent, or Firm—Sughrue Mion, PLLC (57) ABSTRACT

Image signals, which represent images of an object to be subjected to abnormal pattern detection processing, are selected from given image signals. When a selected image signal, which represents an image of the object to be subjected to the abnormal pattern detection processing, is received, an input monitoring device monitors feeding of all of the other image signals, which are to be grouped together with the received image signal and which represent images of the same object of the same patient. In cases where all of the other image signals have been received, the input monitoring device feeds all of the received image signals, which represent the images of the same object of the same patient and which are to be subjected to the abnormal pattern detection processing, in a single set into the abnormal pattern detection processing step. The abnormal pattern detection processing is performed on the image signals having been fed in the single set.

20 Claims, 7 Drawing Sheets

ABNORMAL PATTERN DETECTION PROCESSING METHOD AND SYSTEM

BACKGROUND OF THE INVENTION

1. Field of the Invention

This invention relates to an abnormal pattern detection processing method and system. This invention particularly relates to an improvement in processing of an image, on which an abnormal pattern detection processing is to be performed.

2. Description of the Prior Art

In medical fields, various kinds of image forming modalities (i.e., image input apparatuses), such as computed tomography (CT) scanners, magnetic resonance imaging (MRI) apparatuses, and computed radiography (CR) apparatuses, have become popular as apparatuses for forming images to be used in making a diagnosis. Also, with the rapid advances made in network techniques in recent years, there has arisen a tendency toward utilization of networks for connecting image forming modalities, which are located in examination rooms of hospitals, or the like, and terminals or image output devices, such as image display devices (cathode ray tube (CRT) display devices, liquid crystal display devices, and the like), and printers (laser printers (LP), e.g. laser imagers, and the like), which are located in consultation rooms, laboratories, and the like. In such cases, visible images to be used in making a diagnosis can be reproduced in the consultation rooms from image signals, which have been acquired with the image forming modalities located in the examination rooms.

Further, it has been proposed to provide a quality assurance workstation (QAWS) on the medical image network constituted in the manner described above. The QAWS collectively manages image signals, which have been acquired with various kinds of image forming modalities, processed image signals, which have been obtained from image processing performed on the acquired image signals such that image quality may be enhanced, and the like.

Before the acquired image signals are transferred to various kinds of terminals or the image output devices located on the network, the QAWS checks fundamental image quality of the image signals and acts as a server for storing the image signals. Specifically, before the signals are transferred to the terminals or the image output devices, the QAWS simply checks the presence or absence of severe defect of images, which may occur due to a failure in image recording performed by the image forming modalities, a mistake made during readout of the recorded images, inappropriate processing in various kinds of intermediate processing, or the like.

Examples of image signals, which are acquired with the image forming modalities and fed into the QAWS, include image signals representing mamma images. The mamma images are recorded primarily for making a diagnosis of breast cancer. The applicant proposed abnormal pattern detection processing systems (computer aided medical image diagnosing systems) for automatically detecting an abnormal pattern, which suggests the presence of breast cancer, or the like, from a mamma image, or the like, by the utilization of a computer, and reproducing and displaying the abnormal pattern in various display forms. The abnormal pattern detection processing systems are described in, for example, Japanese Unexamined Patent Publication Nos. 8(1996)-294479 and 8(1996)-287230.

As abnormal pattern detecting means for performing processing for detecting an abnormal pattern, the abnormal pattern detection processing systems are provided with abnormal pattern detecting means utilizing an iris filter, wherein image density gradients (or luminance gradients) in an image are represented by image density gradient vectors, and an image area, which is associated with a high degree of centralization of the image density gradient vectors, is detected as an abnormal pattern. Alternatively, the abnormal pattern detection processing systems are provided with abnormal pattern detecting means utilizing a morphology filter, wherein a multi-structure element in accordance with the size of an abnormal pattern to be detected is utilized, and an image area, at which the image density changes in a range spatially narrower than the multi-structure element, is detected as an abnormal pattern. With the abnormal pattern detecting means utilizing the iris filter, a tumor pattern (a form of the abnormal pattern), which is a form of breast cancer, or the like, can be detected automatically. With the abnormal pattern detecting means utilizing the morphology filter, a small calcified pattern (a form of the abnormal pattern), which is a different form of breast cancer, or the like, can be detected automatically.

However, the abnormal pattern detection processing performed by the abnormal pattern detecting means requires a large amounts of operations with respect to each of pixels constituting an image, and a heavy load is required for the operations with respect to the entire area of the image. Therefore, in the medical image network described above, in order for the load to the QAWS to be prevented from becoming heavy, the abnormal pattern detecting means should preferably be provided as special-purpose detection means independent of the QAWS.

In cases where the abnormal pattern detecting means is constituted as a device independent of the QAWS, it is necessary for the operator to perform an operation for transferring only the mamma image signals, which are among a plurality of image signals fed from all image forming modalities into the QAWS, from the QAWS into the abnormal pattern detecting means.

As for the mammography, a single plan image and a single side image are recorded for each of the right and left mammae. Therefore, ordinarily, four mamma images are recorded per patient. When a medical doctor, or the like, finally makes a diagnosis, the four mamma images are seen and compared with one another, and the position of occurrence of an abnormal pattern, the form of occurrence of the abnormal pattern, and the like, are checked. Accordingly, in the abnormal pattern detecting means, four mamma image signals representing the four mamma images of each patient should preferably be processed together. Also, the four mamma image signals representing the four mamma images of each patient should preferably be fed as a single set into the image output device. For such purposes, it is necessary for the operator to perform an operation for grouping the four mamma image signals representing the four mamma images of each patient into a single set during the classifying operation described above.

However, a large number of image signals are fed from a plurality of image forming modalities, which are connected to the network, into the QAWS. Therefore, considerable time and labor are required for the operator to perform the manual operations for extracting only the mamma image signals from the large number of image signals, grouping the image signals corresponding to each patient into a single set, and transferring each set of the image signals into the abnormal pattern detecting means. Also, in cases where the number of the image signals to be processed by the QAWS becomes very large, it is expected that the operator cannot manually cope with the large number of the image signals. Further, it often occurs that the abnormal pattern detection processing should be performed urgently when the operator is absent.

SUMMARY OF THE INVENTION

The primary object of the present invention is to provide an abnormal pattern detection processing method, wherein image signals, which are among a plurality of given image signals and which are to be subjected to abnormal pattern detection processing, such as image signals representing mamma images or chest images, are capable of being automatically grouped into a single set for each patient, and an operator need not perform manual operations for the grouping of the image signals.

Another object of the present invention is to provide a system for carrying out the abnormal pattern detection processing method.

An abnormal pattern detection processing method and system in accordance with the present invention are characterized by selecting image signals, which are among a plurality of received image signals and which are to be subjected to abnormal pattern detection processing, such as image signals representing mamma images, transferring only the selected image signals into abnormal pattern detecting means, grouping the image signals, which represent images of a single object varying in object orientation, or the like, into a single set in units of a patient, and performing abnormal pattern detection processing with the abnormal pattern detecting means.

Specifically, the present invention provides an abnormal pattern detection processing method, comprising the steps of:

i) feeding image signals from a predetermined image input apparatus into image signal selecting means, each of the image signals being provided with subsidiary information capable of specifying a kind of an object and a patient, ii) selecting image signals, which are among the image signals having been received from the image input apparatus and which represent images of an object to be subjected to abnormal pattern detection processing performed by abnormal pattern detecting means, the selection being performed by the image signal selecting means, iii) feeding an image signal, which represents an image of the object to be subjected to the abnormal pattern detection processing, from the image signal selecting means into input monitoring means, iv) monitoring feeding of all of the other image signals, which are to be grouped into a single set together with the image signal representing the image of the object to be subjected to the abnormal pattern detection processing and which represent images of the same object of the same patient, from the image signal selecting means into the input monitoring means, v) in cases where it has been detected that all of the other image signals have been fed into the input monitoring means, feeding all of the received image signals, which represent the images of the same object of the same patient and which are to be subjected to the abnormal pattern detection processing, in a single set from the input monitoring means into the abnormal pattern detecting means, vi) performing the abnormal pattern detection processing on the image signals having been fed in the single set into the abnormal pattern detecting means, an abnormal pattern embedded in at least one of the images represented by the image signals being thereby detected, and vii) feeding at least image signal components, which represent the abnormal pattern, into a predetermined image output device.

The present invention also provides a system for carrying out the abnormal pattern detection processing method in accordance with the present invention. Specifically, the present invention also provides an abnormal pattern detection processing system, comprising:

i) abnormal pattern detecting means for performing abnormal pattern detection processing on received image signals, detecting an abnormal pattern embedded in at least one of images represented by the image signals, and feeding at least image signal components, which represent the abnormal pattern, into a predetermined image output device, ii) image signal selecting means for receiving image signals, each of which is provided with subsidiary information capable of specifying a kind of an object and a patient, from a predetermined image input apparatus, selecting image signals, which are among the image signals having been received from the image input apparatus and which represent images of an object to be subjected to the abnormal pattern detection processing performed by the abnormal pattern detecting means, and feeding out the selected image signals, and iii) input monitoring means for operating such that:

a) in cases where an image signal, which represents an image of the object to be subjected to the abnormal pattern detection processing, is received from the image signal selecting means, the input monitoring means monitors feeding of all of the other image signals, which are to be grouped into a single set together with the image signal representing the image of the object to be subjected to the abnormal pattern detection processing and which represent images of the same object of the same patient, from the image signal selecting means, and b) in cases where it has been detected that all of the other image signals have been fed into the input monitoring means, the input monitoring means feeds all of the received image signals, which represent the images of the same object of the same patient and which are to be subjected to the abnormal pattern detection processing, in a single set into the abnormal pattern detecting means.

The term "abnormal pattern detecting means" as used herein means the means for automatically detecting an abnormal pattern, which suggests the presence of breast cancer, or the like, from a mamma image, a chest image, or the like. Such means is disclosed in, for example, Japanese Unexamined Patent Publication Nos. 8(1996)-294479 and 8(1996)-287230. By way of example, the abnormal pattern detecting means may be the means utilizing an iris filter, wherein an image area, which is associated with a high degree of centralization of image density gradient vectors, is detected as an abnormal pattern. Alternatively, the abnormal pattern detecting means may be the means utilizing a morphology filter, wherein an image area, at which the image density changes in a range spatially narrower than a multi-structure element, is detected as an abnormal pattern.

Also, the term "feeding at least image signal components, which represent an abnormal pattern, into a predetermined image output device" as used herein means that only the image signal components representing the detected abnormal pattern may be fed into the predetermined image output device, or that the image signal components representing the detected abnormal pattern and the original image signal representing the original image may be fed together into the predetermined image output device. In cases where the abnormal pattern detecting means feeds the image signal components representing the detected abnormal pattern and the original image signal representing the original image together into the predetermined image output device, the abnormal pattern and the original image may be reproduced and displayed automatically in accordance with a predetermined layout. Alternatively, layout conditions may be specified previously from a terminal, which is connected to the image output device, and the abnormal pattern and the original image may be reproduced and displayed in accordance with the specified layout conditions.

The image layout may take one of various known forms, such as those disclosed in Japanese Unexamined Patent Publication No. 8(1996)-294479. For example, the original image and the abnormal pattern may be reproduced and displayed as independent images in a multi-window form on a single display screen or a single output medium. Alternatively, the original image and the abnormal pattern may be superposed one upon the other and displayed in this form in a single window. As another alternative, a plurality of images (e.g., right and left mamma images), which are to be grouped into a single set, may also be reproduced and displayed in a multi-window form on a single display screen or a single output medium.

Examples of the image input apparatuses include various kinds of image forming modalities (such as CT scanners, MRI apparatuses, and CR apparatuses), and memories storing image signals. Examples of the image output devices include image display devices (CRT display devices, liquid crystal display devices, and the like), and printers (laser printers (LP), e.g. laser imagers, and the like). The image input apparatuses and the image output devices may be connected to a network, such as a medical image network.

The term "subsidiary information" as used herein means image recording menu information, identification (ID) information for specifying a patient, information representing the date on which the image was recorded, a combination of the above-enumerated pieces of information, and the like. The image recording menu information represents the kind of the object (i.e., the site of a human body, such as the head, the chest, the abdominal cavity, the mamma, the neck, or the extremities), the object orientation (such as a frontal orientation or a lateral orientation), in which the object was placed when the image of the object was recorded, and the image recording technique used (such as simple image recording, tomography, or contrasted image recording).

The term "image signals representing images of an object to be subjected to abnormal pattern detection processing" as used herein means the image signals representing the mamma images, the chest images, and the like. As for such an object, ordinarily, a plurality of images are recorded in a single examination with respect to a single patient.

The image signal selecting means selects the image signals, which represent the images of the object to be subjected to the abnormal pattern detection processing. The selection should preferably be performed in accordance with the subsidiary information, which is appended to each image signal and which represents the kind of the object. The image signals having been selected by the image signal selecting means are fed into the input monitoring means. The other image signals, which are not fed from the image signal selecting means into the input monitoring means, may be fed from the image signal selecting means into image processing means, the image output device, or the like.

By way of example, in cases where the image signals representing the images of an object are the mamma image signals, ordinarily, a single plan image and a single lateral image are recorded with respect to each of the right and left mammae in a single examination. Therefore, four mamma image signals per patient are grouped into a single set. Accordingly, in cases where a first mamma image signal is fed into the input monitoring means, the remaining three mamma image signals correspond to "all of the other image signals, which are to be grouped into a single set together with the image signal representing the image of the object to be subjected to the abnormal pattern detection processing and which represent images of the same object of the same patient." The foregoing also applies to objects other than the mammae. For example, as for chest images, an image signal representing a plan object image (also referred to as a frontal object image) and an image signal representing a lateral object image may be grouped into a single set. In such cases, when one of the image signal representing the plan object image and the image signal representing the lateral object image has been fed into the input monitoring means, the other image signal corresponds to "all of the other image signals, which are to be grouped into a single set together with the image signal representing the image of the object to be subjected to the abnormal pattern detection processing and which represent images of the same object of the same patient."

A judgment as to whether all of the image signals, which represent the images of the same object of the same patient, have or have not been fed into the input monitoring means may be made in the manner described below. Specifically, for example, a reference table, which specifies the number of image signals to be inputted with respect to the same object, may be prepared in accordance with the kind of the object. A judgment may be made by making reference to the reference table and in accordance with the subsidiary information appended to the inputted image signal. Also, the feeding of all image signals may be monitored in accordance with the patient ID information and the image recording menu information. Further, ordinarily, as for the same object of the same patient, only a specified number of images (varying in object orientation, image recording direction, or the like) are recorded per day. Therefore, the monitoring may be made in accordance with the patient ID information, the site in the patient the image of which was recorded (one of pieces of the image recording menu information), and the number of images recorded ordinarily.

For example, in the cases of the mammography, it often occurs that image signals representing only either one of the right and left mamma images are to be used (e.g., one of the right and left mammae has been cut off, and therefore image recording is not necessary for the cut-off side). In such cases, all of the four mamma images are not recorded. In such cases, even if the monitoring of the feeding of the four mamma image signals is continued, the completion of the feeding cannot be detected. Also, it may occur that at least one of the image signals to be grouped into a single set is not fed due to a certain cause. In such cases, if the input monitoring means waits for the feeding of all image signals to be grouped into a single set, the input monitoring means cannot appropriately perform the next process, i.e. the process for feeding all of the received image signals, which represent the images of the same object of the same patient and which are to be subjected to the abnormal pattern detection processing, in a single set into the abnormal pattern detecting means.

Therefore, in cases where the input monitoring means received a first image signal with respect to a specific patient and did not detect the feeding of all of the other image signals, which represent images of the same object as the object represented by the first image signal with respect the patient, within a predetermined length of time after the receiving of the first image signal, the input monitoring means may regard that the feeding of all of the other image signals has been detected. In this manner, the input monitoring means may feed only the received image signals, which are to be subjected to the abnormal pattern detection processing, in a single set into the abnormal pattern detecting means. In cases where the input monitoring means is constituted in the manner described above, the problems do not occur in that the image signals to be subjected to the abnormal pattern detection processing cannot be fed into the abnormal pattern detecting means.

Also, the abnormal pattern detection processing system may further comprise set image signal setting means for previously setting a number and/or definition of all of the image signals, which are to be grouped into a single set and which represent the images of the same object of the same patient, (as in the reference table described above) and the input monitoring means monitors the feeding of the image signals from the image signal selecting means in accordance with the number and/or the definition having been set by the set image signal setting means.

For example, in the cases of the mammography, as the number and definition of all of the image signals, which are to be grouped into a single set and which represent the images of the same object of the same patient, one of (1), (2), (3), and (4) described below may be set previously by the set image signal setting means:

(1) a single image signal representing a plan image and a single image signal representing a lateral image with respect to each of the right and left mammae (a total of four image signals), (2) a single image signal representing a plan image with respect to each of the right and left mammae (a total of two image signals), (3) a single image signal representing a lateral image with respect to each of the right and left mammae (a total of two image signals), and (4) a single image signal representing a plan image and a single image signal representing a lateral image with respect to either one of the right and left mammae (a total of two image signals). In this manner, the waiting for the feeding of all of the image signals to be grouped into a single set can be performed appropriately.

With the abnormal pattern detection processing method and system in accordance with the present invention, the image signal selecting means selects the image signals, which are among the image signals having been received from the predetermined image input apparatus and which represent the images of the object to be subjected to the abnormal pattern detection processing. The selection is made in accordance with the subsidiary information appended to each of the image signals. Also, the image signal selecting means feeds the selected image signals into the input monitoring means. Therefore, the operator need not perform the manual operations for selecting the image signals to be fed into the abnormal pattern detecting means and feeding the selected image signals into the abnormal pattern detecting means.

In cases where a first image signal, which represents an image of a specific object of a specific patient, is fed from the image signal selecting means into the input monitoring means, the input monitoring means monitors the feeding of all of the other image signals, which are to be grouped into a single set together with the first image signal and which represent images of the same object of the same patient, from the image signal selecting means. The monitoring is performed in accordance with the subsidiary information appended to the first image signal. In cases where it has been detected that all of the other image signals have been fed into the input monitoring means, the input monitoring means feeds all of the received image signals, which represent the images of the same object of the same patient and which are to be subjected to the abnormal pattern detection processing, in a single set into the abnormal pattern detecting means. Therefore, the operator need not perform the operations for finding the image signals, which are to be grouped into a single set for each patient, from various kinds of many image signals, which are inputted in a random order, and grouping the found image signals into a single set.

The abnormal pattern detecting means performs the abnormal pattern detection processing on the set of the image signals grouped with respect to the same object of the same patient. Information representing the results of the abnormal pattern detection processing is fed into the image output device and reproduced in one of various layout forms.

As described above, with the abnormal pattern detection processing method and system in accordance with the present invention, operations ranging from the input of image signals to the reproduction and displaying of an abnormal pattern can be performed automatically, and the operator need not perform manual operations for such purposes. Therefore, the problems can be prevented from occurring in that a mistake is made in operator's operations due to complicated manual operations and detection of an abnormal pattern becomes late due to the mistake made in operations. Accordingly, routine diagnosis with the detected abnormal pattern can be performed.

DESCRIPTION OF THE PREFERRED EMBODIMENTS

The present invention will hereinbelow be described in further detail with reference to the accompanying drawings.

Figure 1:
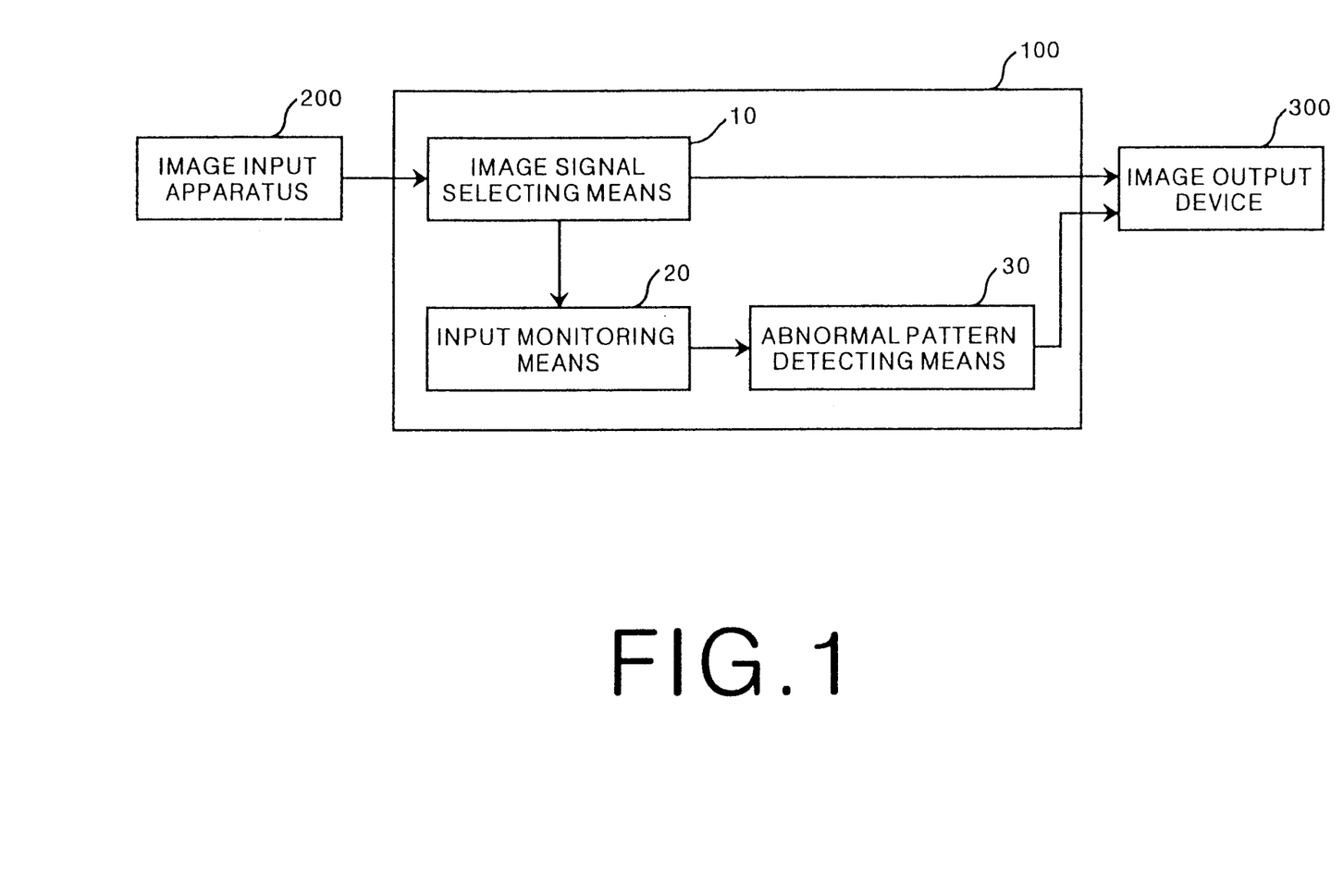
FIG. 1 is a block diagram showing a basic embodiment of the abnormal pattern detection processing system in accordance with the present invention.

FIG. 1 is a block diagram showing a basic embodiment of the abnormal pattern detection processing system in accordance with the present invention. With reference to FIG. 1, an abnormal pattern detection processing system 100 comprises abnormal pattern detecting means 30 for performing abnormal pattern detection processing on received image signals (mamma image signals), detecting an abnormal pattern (a tumor pattern or a small calcified pattern) embedded in at least one of mamma radiation images represented by the image signals, and feeding image signal components, which represent the abnormal pattern, and the original image signals (the mamma image signals) into an image output device 300 such that the images may be reproduced and displayed in a predetermined layout. The abnormal pattern detection processing system 100 also comprises image signal selecting means 10 for receiving a plurality of image signals, each of which is provided with subsidiary information, from an image input apparatus 200, selecting only the mamma image signals in accordance with the subsidiary information, and feeding out the selected mamma image signals into input monitoring means 20. Examples of the subsidiary information include image recording menu information, ID information for specifying a patient, information representing the date on which the image was recorded, a combination of the above-enumerated pieces of information, and the like. The image recording menu information represents the kind of the object (i.e., the site of a human body, such as the head, the chest, the abdominal cavity, the mamma, the neck, or the extremities), the object orientation (such as a frontal orientation or a lateral orientation), in which the object was placed when the image of the object was recorded, and the image recording technique used (such as simple image recording, tomography, or contrasted image recording). The image signal selecting means 10 also feeds image signals, which represent images of objects other than the mammae, into an image output device (e.g., a CRT display device) 300. The abnormal pattern detection processing system 100 further comprises the input monitoring means 20. In cases where a first mamma image signal (e.g., an image signal representing a plan image of the right mamma) with respect to a certain patient is received from the image signal selecting means 10, the input monitoring means 20 monitors the feeding of the other three mamma image signals with respect to the same patient, which represent the other three mamma images having been recorded (or presumed to have been recorded) in a single set together with the mamma image represented by the first mamma image signal, from the image signal selecting means 10. (By way of example, the other three mamma image signals may be an image signal representing a lateral image of the right mamma, an image signal representing a plan image of the left mamma, and an image signal representing a lateral image of the left mamma.) In cases where it has been detected that the four mamma image signals have been fed into the input monitoring means 20, the input monitoring means 20 feeds the four received mamma image signals with respect to the same patient in a single set into the abnormal pattern detecting means 30.

Figure 2:
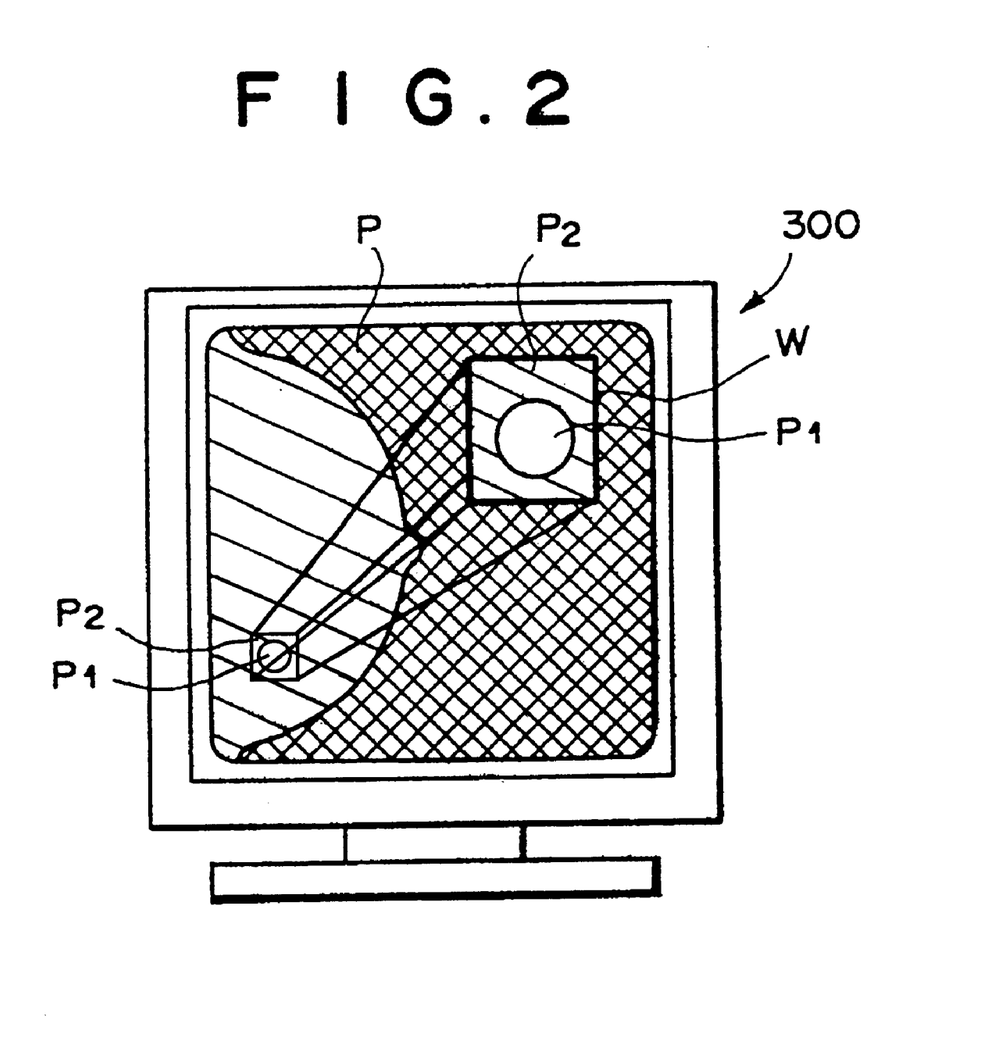
FIG. 2 is a schematic view showing an example of an image layout on an image output device.
Figure 3A:
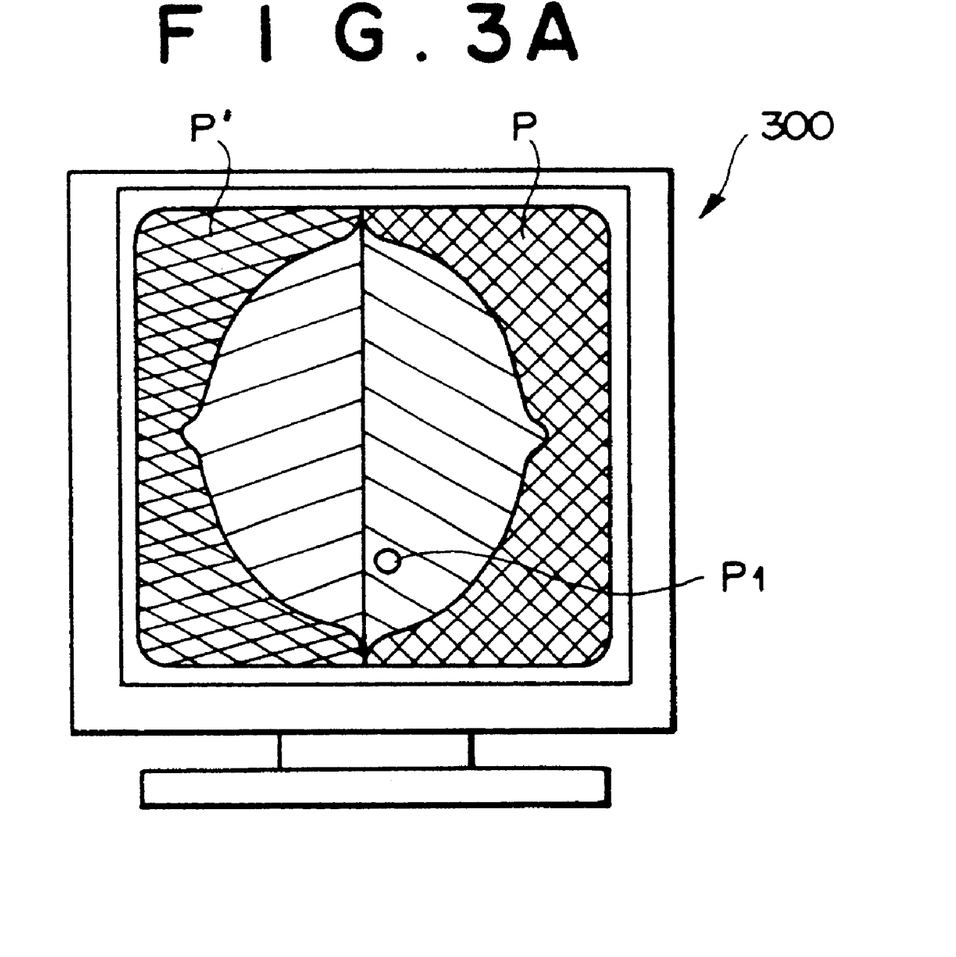
FIGS. 3A and 3B are schematic views showing different examples of image layouts on the image output device.
Figure 3B:
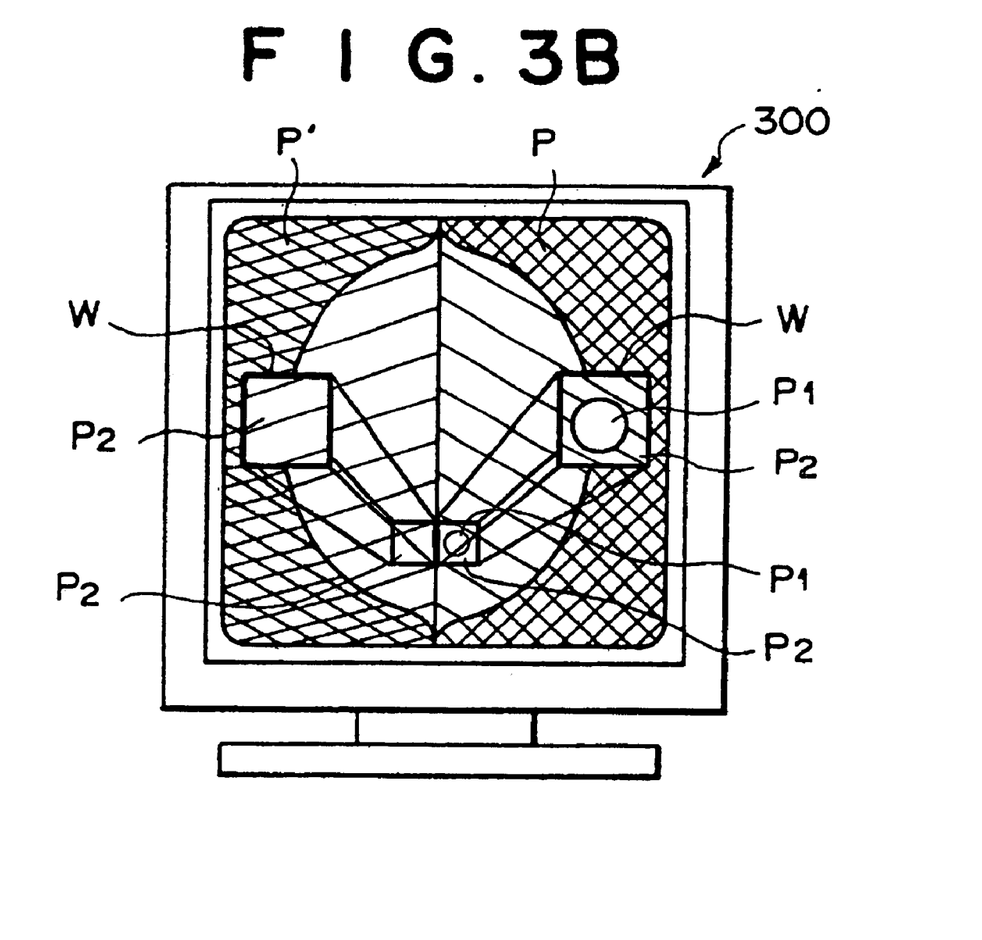
Figure 4A:
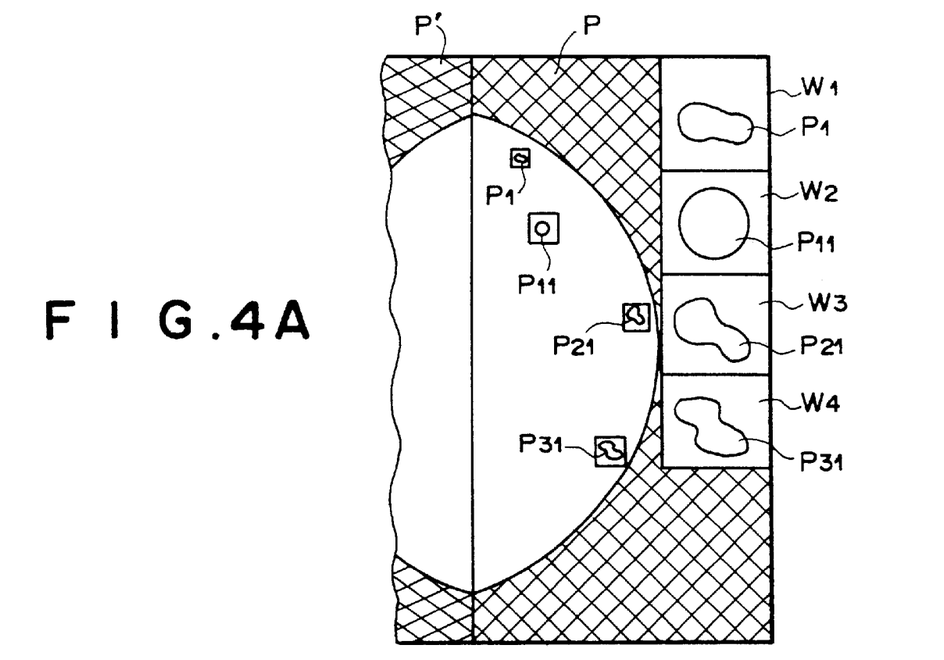
FIGS. 4A and 4B are schematic views showing further different examples of image layouts on the image output device.
Figure 4B:
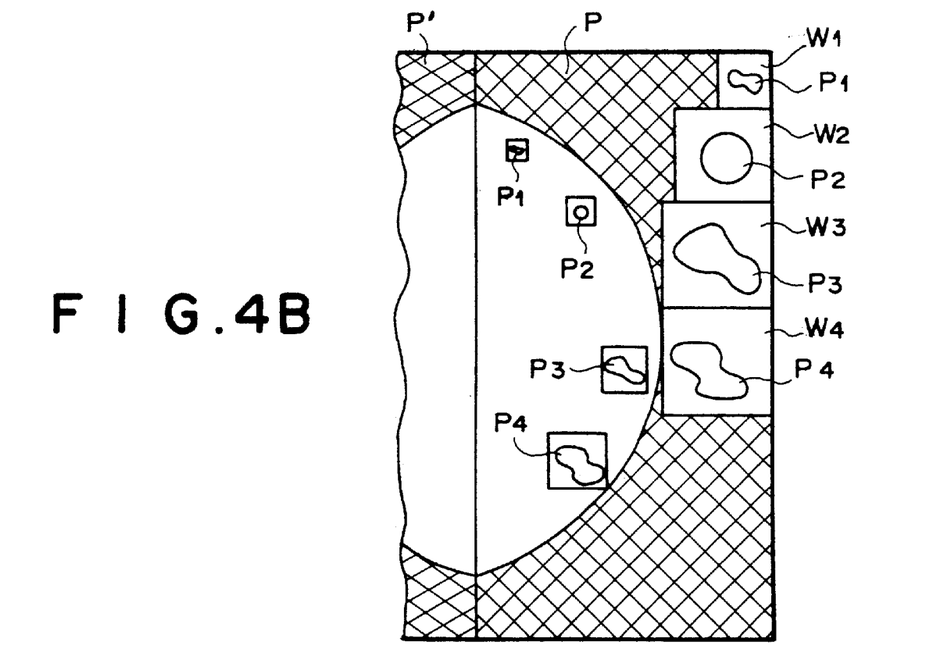

The original image and the abnormal pattern, which has been detected by the abnormal pattern detecting means 30, may be reproduced and displayed by the image output device 300 in, for example, the output layout shown in FIG. 2. In the output layout shown in FIG. 2, an original image (an entire mamma image) P is displayed as an entire area image, and an enlarged image W of a local area limited image, which is constituted of a detected abnormal pattern P1 and a peripheral area P2, is superposed upon a part of the entire area image P. The output layout on the image output device 300 may be varied in various other ways. For example, as illustrated in FIG. 3A or 3B, an original image P of the right mamma and an abnormal pattern P1 may be displayed on the right half of the display screen of the image output device 300 (in cases where it is a CRT display device), and an original image P' of the left mamma and an abnormal pattern P1' may be displayed on the left half of the display screen of the image output device 300. (In this case, the abnormal pattern P1' is not detected, and is therefore not shown in FIGS. 3A and 3B.) In the output layout illustrated in FIG. 3A, the abnormal pattern P1 is enhanced and displayed within the entire area image P. In the output layout illustrated in FIG. 3B, as in the output layout shown in FIG. 2, the enlarged image W of the local area limited image is superposed upon part of the entire area image P, and an enlarged image W' of a local area limited image is superposed upon part of the entire area image P'. Alternatively, as illustrated in FIG. 4A or 4B, the original image P of the right mamma and enlarged images W1, W2, W3, and W4 of local area limited images, which respectively correspond to a plurality of abnormal patterns P1, P11, P21, and P31, may be displayed on the right half of the display screen of the image output device 300, and the original image P' of the left mamma and an abnormal pattern may be displayed on the left half of the display screen of the image output device 300. (only part of the left half of the display screen is shown in FIGS. 4A and 4B.) In the output layout illustrated in FIG. 4A, the sizes of the enlarged images W1, W2, W3, and W4 of the local area limited images are set such that detected abnormal patterns may be illustrated with an identical size, and the enlarged images W1, W2, W3, and W4 are superposed upon part of the entire area image P. In the output layout illustrated in FIG. 4B, the sizes of the enlarged images W1, W2, W3, and W4 of the local area limited images are set such that the detected abnormal patterns may be illustrated with sizes corresponding to the detected sizes, and the enlarged images W1, W2, W3, and W4 are superposed upon part of the entire area image P.

How the abnormal pattern detection processing system 100 operates will be described hereinbelow.

Firstly, radiation image signals representing various kinds of images and the subsidiary information appended to them are fed successively into the image signal selecting means 10 of the abnormal pattern detection processing system 100. The image signal selecting means 10 reads the subsidiary information appended to each of the received image signals, and selects the image signals representing the mamma images in accordance with the subsidiary information. The image signal selecting means 10 feeds the selected mamma image signals into the input monitoring means 20. Also, the image signal selecting means 10 feeds the image signals other than the mamma image signals into the image output device 300.

When the input monitoring means 20 receives the first mamma image signal from the image signal selecting means 10, the input monitoring means 20 reads the patient ID information, which is contained in the subsidiary information appended to the first mamma image signal. Ordinarily, a set of four mamma images are recorded. Therefore, the input monitoring means 20 also reads the ID information appended to the mamma image signals, which are received successively from the image signal selecting means 10. In this manner, the input monitoring means 20 monitors the feeding of the four mamma image signals with respect to the same patient from the image signal selecting means 10. The input monitoring means 20 temporarily stores the mamma image signals, which have already been received.

In cases where it has been detected that the four mamma image signals, to which the same ID information is appended, have been received, the input monitoring means 20 groups the four mamma image signals into a single set and feeds them into the abnormal pattern detecting means 30.

The abnormal pattern detecting means 30 performs the abnormal pattern detection processing successively on the four mamma image signals, which have been received from the input monitoring means 20. In this manner, the abnormal pattern detecting means 30 detects an abnormal pattern from at least one of the four mamma image signals. Also, the abnormal pattern detecting means 30 feeds the original mamma image signal and the image signal components, which represent the detected abnormal pattern, into the image output device 300, such that the original mamma image and the abnormal pattern may be reproduced and displayed in one of various layouts.

In the manner described above, the operations ranging from the input of image signals from the image input apparatus 200 to the reproduction and displaying of the abnormal pattern, which is embedded in the mamma image, on the image output device 300 can be performed automatically, and the operator need not perform manual operations for such purposes. Therefore, the problems can be prevented from occurring in that a mistake is made in operator's operations due to complicated manual operations and detection of an abnormal pattern becomes late due to the mistake made in operations. Accordingly, routine diagnosis with the detected abnormal pattern can be performed easily.

In the abnormal pattern detection processing system 100 described above, in cases where it has been detected that the four mamma image signals, to which the same ID information is appended, have been received, the input monitoring means 20 groups the four mamma image signals into a single set and feeds them into the abnormal pattern detecting means 30. In this manner, the monitoring of the feeding of the image signals is performed in accordance with the number of the received image signals. Alternatively, the monitoring of the feeding of the image signals may be performed in accordance with the patient ID information and the image recording menu information. Specifically, for example, as the mamma image signals with respect to a patient specified by a certain piece of ID information, the following four image signals may be fed into the input monitoring means 20: (a) an image signal, which represents a plan (frontal) image of the right mamma and which is specified by image recording menu code No. 0310, (b) an image signal, which represents a plan (frontal) image of the left mamma and which is specified by image recording menu code No. 0320, (c) an image signal, which represents a lateral image of the right mamma and which is specified by image recording menu code No. 0330, and (d) an image signal, which represents a lateral image of the left mamma and which is specified by image recording menu code No. 0340. In such cases, the input monitoring means 20 monitors the feeding of each of the image signals having image recording menu code Nos. 0310, 0320, 0330, and 0340. In this manner, instead of the monitoring being performed with respect to the number of the "four" image signals, the input monitoring means 20 may monitor whether each of the image signals having the image recording menu code number having been set is or is not received. The monitoring may be continued until all of the image signals having the image recording menu code numbers having been set have been received. In cases where all of the image signals having the image recording menu code numbers having been set have been received, the input monitoring means 20 may feed all of the image signals, which have the image recording menu code numbers having been set and which are specified by the same ID information, in a single set into the abnormal pattern detecting means 30.

Further, ordinarily, as for the same object of the same patient, only a specified number of images (varying in object orientation, image recording direction, or the like) are recorded per day. Therefore, the input monitoring means 20 may perform the monitoring in accordance with the patient ID information, the site in the patient the image of which was recorded (one of pieces of the image recording menu information), and the number of images recorded ordinarily. Specifically, for example, as the mamma image signals having the same patient ID information, ordinarily, four image signals are obtained. Also, it may be defined previously that the image signal representing the plan (frontal) image of the right mamma is fed firstly, the image signal representing the plan (frontal) image of the left mamma is fed secondly, the image signal representing the lateral image of the right mamma is fed thirdly, and the image signal representing the lateral image of the left mamma is fed fourthly. In such cases, the input monitoring means 20 may monitor the feeding of the four mamma image signals having the same ID information. In cases where the four mamma image signals having the same ID information have been received, the input monitoring means 20 may judge that all of the image signals have been received. The input monitoring means 20 may then feed the four image signals in a single set into the abnormal pattern detecting means 30.

Figure 5:
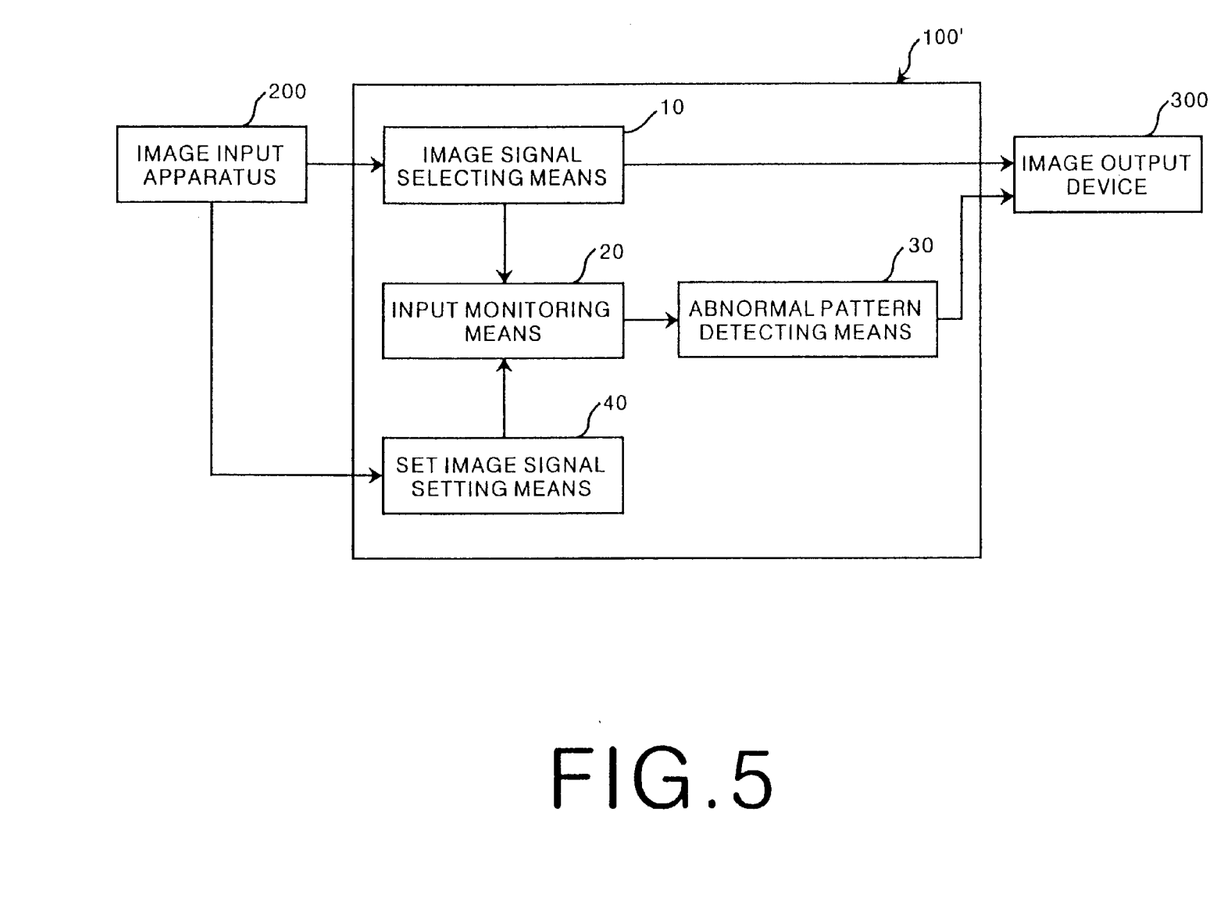
FIG. 5 is a block diagram showing a different embodiment of the abnormal pattern detection processing system in accordance with the present invention.

FIG. 5 is a block diagram showing a different embodiment of the abnormal pattern detection processing system in accordance with the present invention. An abnormal pattern detection processing system 100' illustrated in FIG. 5 is constituted basically in the same manner as that in the abnormal pattern detection processing system 100 of FIG. 1, except that the abnormal pattern detection processing system 100' further comprises set image signal setting means 40 for previously setting the number and/or the definition of all of the image signals, which are to be grouped into a single set and which represent the images of the same object of the same patient.

The set image signal setting means 40 previously sets the number and/or definition of a plurality of image signals, which are to be grouped into a single set by the input monitoring means 20. For example, in the cases of the mammography, the image recording operation is performed in one of modes described in (1), (2), (3), and (4) below:
(1) recording of a single plan image and a single lateral image with respect to each of the right and left mammae (a total of four image signals),
(2) recording of a single plan image with respect to each of the right and left mammae (a total of two image signals),
(3) recording of a single lateral image with respect to each of the right and left mammae (a total of two image signals), and
(4) recording of a single plan image and a single lateral image with respect to either one of the right and left mammae (a total of two image signals).

For example, in cases where the image recording operation is performed in the mode of (2), only two image signals with respect to a certain patient are fed from the image input apparatus 200 into the abnormal pattern detection processing system 100', and the other two image signals are not fed into the abnormal pattern detection processing system 100'. Therefore, if the input monitoring means 20 continues to monitor the feeding of the other two image signals, the image signals with respect to the patient cannot be fed out into the abnormal pattern detecting means 30, no visible image is reproduced and displayed on the image output device 300, and a diagnosis cannot be made.

If the number or the definition of the image signals to be grouped into a single set is fixed, the problems described above may occur.

In such cases, for example, dummy image signals may be fed as the other two image signals. Alternatively, the input monitoring means 20 may be set such that, in cases where a predetermined length of time has elapsed after the first image signal has been received, the input monitoring means 20 regards that all of the necessary image signals have been received. However, with the abnormal pattern detection processing system 100' of FIG. 5 provided with the set image signal setting means 40, by the utilization of the set image signal setting means 40, the operator can arbitrarily set and alter the number and/or the definition of the image signals to be grouped into a single set. Therefore, the input monitoring means 20 can monitor the feeding of the image signals in accordance with the number and/or the definition having been set or altered by the set image signal setting means 40. For example, in the cases of the image recording mode of (2) described above, with the set image signal setting means 40, the operator may set the number of the image signals (in this case, two) to be grouped into a single set. In such cases, the input monitoring means 20 does not wait for the feeding of the four image signals. At the time at which the two image signals have been received, the input monitoring means 20 feeds the two received image signals in a single set into the abnormal pattern detecting means 30. Therefore, the problems can be prevented from occurring in that no visible image is reproduced and displayed on the image output device 300.

As described above, the operator may feed the information, which represents the number and/or the definition of the image signals to be grouped into a single set, into the set image signal setting means 40 and may thereby set or alter the number and/or the definition. Alternatively, at the time of the image recording operation, the information, which represents the number and/or the definition of the image signals to be grouped into a single set, may be set as part of the subsidiary information, which is appended to the image signal, by the utilization of an ID terminal, or the like. Also, in cases where the image signal is fed into the image input apparatus 200, the set image signal setting means 40 may read the information, which represents the number and/or the definition of the image signals to be grouped into a single set and which has been set as part of the subsidiary information, from the image input apparatus 200.

Figure 6:
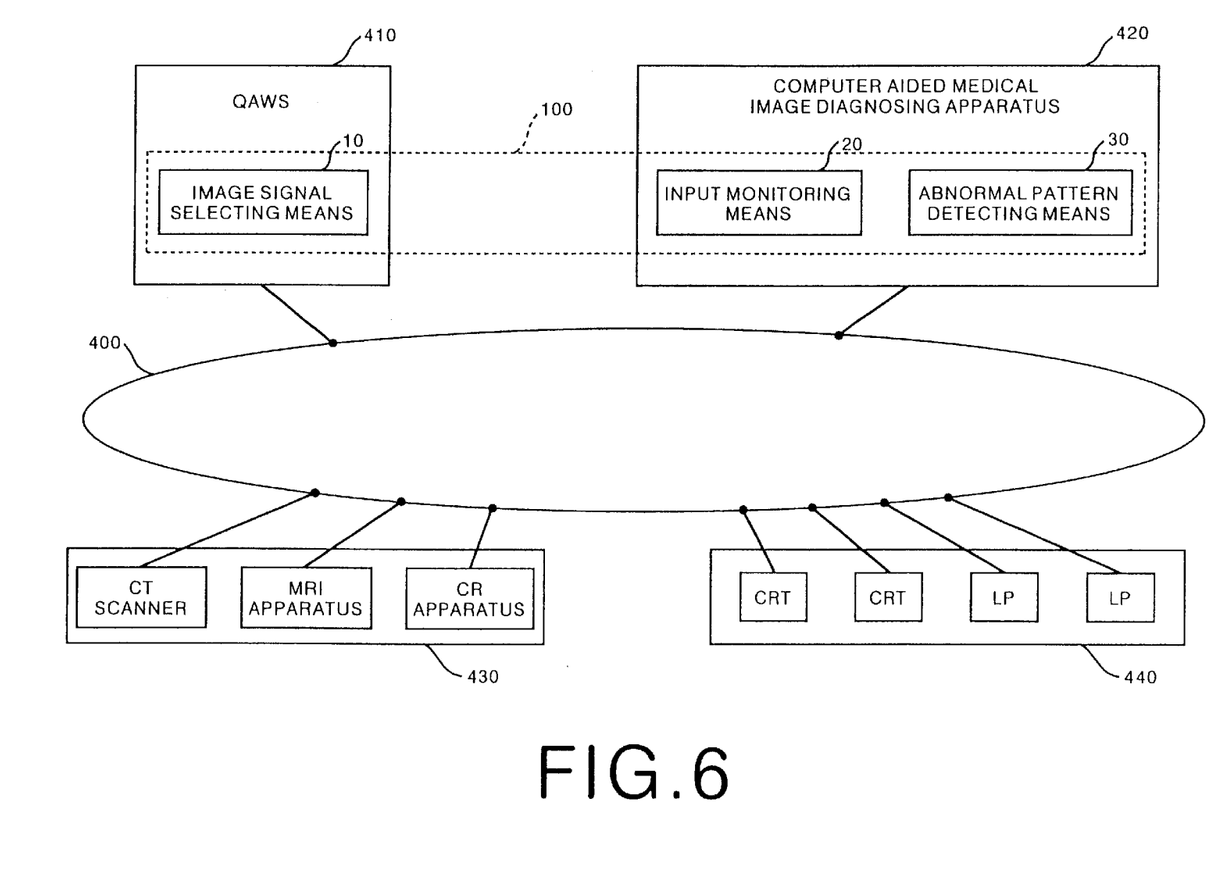
FIG. 6 is a block diagram showing a further different embodiment of the abnormal pattern detection processing system in accordance with the present invention.

FIG. 6 is a block diagram showing a further different embodiment of the abnormal pattern detection processing system in accordance with the present invention. In the embodiment of FIG. 6, the abnormal pattern detection processing system 100 of FIG. 1 is connected to a medical image network (hereinbelow referred to simply as the network) 400. As image input apparatuses 430, a CT scanner, an MRI apparatus, and a CR apparatus are connected to the network 400. Also, as image output devices 440, CRT display devices and laser printers (LP's) are connected to the network 400. Further, a quality assurance workstation (QAWS) 410 and a computer aided medical image diagnosing apparatus 420 are connected to the network 400. The QAWS 410 receives all of the image signals, which have been fed from the image input apparatuses 430 into the network 400. The QAWS 410 stores and manages all of the image signals. The computer aided medical image diagnosing apparatus 420 is utilized to perform various automatic diagnoses in accordance with the received image signals.

The QAWS 410 is provided with the image signal selecting means 10, which is among the constituents of the abnormal pattern detection processing system 100 shown in FIG. 1. The computer aided medical image diagnosing apparatus 420 is provided with the input monitoring means 20 and the abnormal pattern detecting means 30. The image signal selecting means 10 of the QAWS 410 selects the mamma image signals from all of the image signals, which are stored in the QAWS 410. The image signal selecting means 10 feeds the selected mamma image signals via the network 400 into the input monitoring means 20.

The input monitoring means 20 and the abnormal pattern detecting means 30 of the computer aided medical image diagnosing apparatus 420 operate in the same manner as that in the abnormal pattern detection processing system 100 of FIG. 1. The abnormal pattern detecting means 30 feeds the image signal, which represents the detected abnormal pattern, and the like, via the network 400 into a CRT display device, which is among the image output devices 440 connected to the network 400 and from which an output request has been made.

As described above, with this embodiment of the abnormal pattern detection processing system 100, the operations ranging from the input of image signals from the image input apparatuses 430 into the network 400 to the reproduction and displaying of the abnormal pattern, or the like, which is embedded in the mamma image, on the image output devices 440 can be performed automatically, and the operator need not perform manual operations for such purposes. Therefore, the problems can be prevented from occurring in that a mistake is made in operator s operations due to complicated manual operations and detection of an abnormal pattern becomes late due to the mistake made in operations. Accordingly, routine diagnosis with the detected abnormal pattern can be performed easily.

In the aforesaid embodiments of the abnormal pattern detection processing system in accordance with the present invention, the image signal selecting means 10 selects only the mamma image signals and feed them into the input monitoring means 20. However, in the abnormal pattern detection processing system in accordance with the present invention, the image signals to be selected are not limited to the mamma image signals and may be various other kinds of image signals, which are to be subjected to the abnormal pattern detection processing and which represents images of the same object varying in object orientation, or the like, and are to be grouped into a single set. For example, the image signals to be selected may be chest image signals, and the like.

Also, the input monitoring means 20 may be provided with specific means having functions such that, in cases where the input monitoring means 20 received a first image signal with respect to a specific patient and did not detect the feeding of all of the other image signals, which represent images of the same object as the object represented by the first image signal with respect the patient, within a predetermined length of time after the receiving of the first image signal, it may be regarded that the feeding of all of the other image signals has been detected. In this manner, the specific means may feed only the received image signals, which are to be subjected to the abnormal pattern detection processing, in a single set into the abnormal pattern detecting means 30. With the utilization of the specific means, the problems can be prevented from occurring in that, in cases where at least one of the image signals to be grouped into a single set is not fed due to a certain cause, the image signals to be subjected to the abnormal pattern detection processing cannot be fed into the abnormal pattern detecting means 30.

As in the embodiment of FIG. 5, in lieu of the input monitoring means 20 being provided with the timer functions described above, the set image signal setting means may be utilized.

What is claimed is:

1. An abnormal pattern detection processing method, comprising the steps of:
   i) feeding image signals from a predetermined image input apparatus into image signal selecting means, each of the image signals being provided with subsidiary information capable of specifying a kind of an object and a patient,
   ii) selecting image signals, which are among the image signals having been received from said image input apparatus and which represent images of an object to be subjected to abnormal pattern detection processing performed by abnormal pattern detecting means, the selection being performed by said image signal selecting means,
   iii) feeding an image signal, which represents an image of the object to be subjected to the abnormal pattern detection processing, from said image signal selecting means into input monitoring means,
   iv) monitoring feeding of all of the other image signals, which are to be grouped into a single set together with said image signal representing the image of the object to be subjected to the abnormal pattern detection processing and which represent images of the same object of the same patient, from said image signal selecting means into said input monitoring means,
   v) in cases where it has been detected that all of said other image signals have been fed into said input monitoring means, feeding all of the received image signals, which represent the images of the same object of the same patient and which are to be subjected to the abnormal pattern detection processing, in a single set from said input monitoring means into said abnormal pattern detecting means,
   vi) performing the abnormal pattern detection processing on the image signals having been fed in the single set into said abnormal pattern detecting means, an abnormal pattern embedded in at least one of the images represented by the image signals being thereby detected, and
   vii) feeding at least image signal components, which represent the abnormal pattern, into a predetermined image output device.

2. A method as defined in claim 1 wherein said abnormal pattern detecting means is means utilizing an iris filter for detecting an image area, which is associated with a high degree of centralization of image density gradient vectors, as an abnormal pattern, and/or means utilizing a morphology filter for detecting an image area, at which the image density changes in a range spatially narrower than a multi-structure element, as an abnormal pattern.

3. A method as defined in claim 1 wherein the image signals, which represent images of the object to be subjected to the abnormal pattern detection processing performed by said abnormal pattern detecting means, are mamma image signals.

4. A method as defined in claim 2 wherein the image signals, which represent images of the object to be subjected to the abnormal pattern detection processing performed by said abnormal pattern detecting means, are mamma image signals.

5. A method as defined in claim 1, 2, 3, or 4 wherein said image signal selecting means selects the image signals, which represent the images of the object to be subjected to the abnormal pattern detection processing, in accordance with the subsidiary information.

6. A method as defined in claim 1, 2, 3, or 4 wherein said input monitoring means detects the feeding of all of the other image signals, which represent images of the same object of the same patient, in accordance with the subsidiary information.

7. A method as defined in claim 1, 2, 3, or 4 wherein, in cases where said input monitoring means received a first image signal with respect to a specific patient and did not detect the feeding of all of the other image signals, which represent images of the same object as the object represented by said first image signal with respect to the patient, within a predetermined length of time after the receiving of said first image signal, said input monitoring means regards that the feeding of all of said other image signals has been detected.

8. A method as defined in claim 1, 2, 3, or 4 wherein the method further comprises the step of previously setting a number and/or definition of all of the image signals, which are to be grouped into a single set and which represent the images of the same object of the same patient, with set image signal setting means, and
   said input monitoring means monitors the feeding of the image signals from said image signal selecting means in accordance with the number and/or the definition having been set by said set image signal setting means.

9. A method as defined in claim 1 further comprising storing in said image input monitoring means each of said image signals which are to be grouped into a single set.

10. A method as defined in claim 1 wherein said performing the abnormal pattern detection processing on the image signals having been fed in the single set further comprises successively processing each of the image signals in the set after the entire set of image signals has been received by the abnormal pattern detection means.

11. An abnormal pattern detection processing system, comprising:
    i) abnormal pattern detecting means for performing abnormal pattern detection processing on received image signals, detecting an abnormal pattern embedded in at least one of images represented by the image signals, and feeding at least image signal components, which represent the abnormal pattern, into a predetermined image output device,
    ii) image signal selecting means for receiving image signals, each of which is provided with subsidiary information capable of specifying a kind of an object and a patient, from a predetermined image input apparatus, selecting image signals, which are among the image signals having been received from said image input apparatus and which represent images of an object to be subjected to the abnormal pattern detection processing performed by said abnormal pattern detecting means, and feeding out the selected image signals, and
    iii) input monitoring means for operating such that:
        a) in cases where an image signal, which represents an image of the object to be subjected to the abnormal pattern detection processing, is received from said image signal selecting means, said input monitoring means monitors feeding of all of the other image signals, which are to be grouped into a single set together with said image signal representing the image of the object to be subjected to the abnormal pattern detection processing and which represent images of the same object of the same patient, from said image signal selecting means, and
        b) in cases where it has been detected that all of said other image signals have been fed into said input monitoring means, said input monitoring means feeds all of the received image signals, which represent the images of the same object of the same patient and which are to be subjected to the abnormal pattern detection processing, in a single set into said abnormal pattern detecting means.

12. A system as defined in claim 11 wherein said abnormal pattern detecting means is means utilizing an iris filter for detecting an image area, which is associated with a high degree of centralization of image density gradient vectors, as an abnormal pattern, and/or means utilizing a morphology filter for detecting an image area, at which the image density changes in a range spatially narrower than a multi-structure element, as an abnormal pattern.

13. A system as defined in claim 12 wherein the image signals, which represent images of the object to be subjected to the abnormal pattern detection processing performed by said abnormal pattern detecting means, are mamma image signals.

14. A system as defined in claim 11 wherein the image signals, which represent images of the object to be subjected to the abnormal pattern detection processing performed by said abnormal pattern detecting means, are mamma image signals.

15. A system as defined in claim 11, 12, 14, or 13 wherein said image signal selecting means selects the image signals, which represent the images of the object to be subjected to the abnormal pattern detection processing, in accordance with the subsidiary information.

16. A system as defined in claim 11, 12, 14 or 13 wherein said input monitoring means detects the feeding of all of the other image signals, which represent images of the same object of the same patient, in accordance with the subsidiary information.

17. A system as defined in claim 11, 10, 14, or 13 wherein, in cases where said input monitoring means received a first image signal with respect to a specific patient and did not detect the feeding of all of the other image signals, which represent images of the same object as the object represented by said first image signal with respect the patient, within a predetermined length of time after the receiving of said first image signal, said input monitoring means regards that the feeding of all of said other image signals has been detected.

18. A system as defined in claim 11, 12, 14, or 13 wherein the system further comprises set image signal setting means for previously setting a number and/or definition of all of the image signals, which are to be grouped into a single set and which represent the images of the same object of the same patient, and said input monitoring means monitors the feeding of the image signals from said image signal selecting means in accordance with the number and/or the definition having been set by said set image signal setting means.

19. A method as defined in claim 11 further comprising storing in said image input monitoring means each of said image signals which are to be grouped into a single set.

20. A method as defined in claim 11 wherein said performing the abnormal pattern detection processing on the image signals having been fed in the single set further comprises successively processing each of the image signals in the set after the entire set of image signals has been received by the abnormal pattern detection means.

* * * * *